United States Patent
Ng Tari et al.

(10) Patent No.: US 9,244,909 B2
(45) Date of Patent: Jan. 26, 2016

(54) SYSTEM AND METHOD FOR EXTRACTING ONTOLOGICAL INFORMATION FROM A BODY OF TEXT

(71) Applicant: General Electric Company, Schenectady, NY (US)

(72) Inventors: Luis Babaji Ng Tari, Glenville, NY (US); Abha Moitra, Scotia, NY (US)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 13/710,218

(22) Filed: Dec. 10, 2012

(65) Prior Publication Data

US 2014/0163955 A1   Jun. 12, 2014

(51) Int. Cl.
G06F 12/06 (2006.01)
G06F 17/27 (2006.01)

(52) U.S. Cl.
CPC .................................. G06F 17/2785 (2013.01)

(58) Field of Classification Search
CPC ............................... G06F 17/27; G06F 17/274
USPC ........................................................ 704/1–10
See application file for complete search history.

(56) References Cited

U.S. PATENT DOCUMENTS

| | | | | |
|---|---|---|---|---|
| 6,081,774 | A * | 6/2000 | de Hita et al. | 704/9 |
| 6,513,010 | B1 * | 1/2003 | Lewin et al. | 704/270.1 |
| 7,027,974 | B1 | 4/2006 | Busch et al. | |
| 7,346,490 | B2 * | 3/2008 | Fass et al. | 704/7 |
| 7,496,593 | B2 | 2/2009 | Gardner et al. | |
| 7,890,514 | B1 | 2/2011 | Mohan et al. | |
| 8,015,143 | B2 | 9/2011 | Estes | |
| 8,103,682 | B2 | 1/2012 | Funes et al. | |
| 8,131,756 | B2 | 3/2012 | Carus et al. | |
| 8,156,120 | B2 | 4/2012 | Brady | |
| 8,326,603 | B1 * | 12/2012 | Budzinski | 704/9 |
| 2002/0111803 | A1 * | 8/2002 | Romero | 704/231 |
| 2004/0107088 | A1 * | 6/2004 | Budzinski | 704/10 |
| 2005/0049852 | A1 * | 3/2005 | Chao | 704/9 |
| 2005/0120359 | A1 * | 6/2005 | Shoji et al. | 719/321 |
| 2005/0197828 | A1 * | 9/2005 | McConnell et al. | 704/9 |
| 2005/0256888 | A1 * | 11/2005 | McConnell | 707/100 |
| 2005/0256889 | A1 * | 11/2005 | McConnell | 707/100 |
| 2008/0021700 | A1 * | 1/2008 | Moitra et al. | 704/9 |

OTHER PUBLICATIONS

Lyman, "Intelligent Retrieval & Categorization", Uc Berkeley Press Release, pp. 1-18, Oct. 18, 2000.
Maletic et al., "Adding Structure to Unstructured Text", pp. 1-5, Aug. 5, 2005.

(Continued)

Primary Examiner — Michael N Opsasnick
(74) Attorney, Agent, or Firm — Schwegman Lundberg & Woessner, P.A.

(57) ABSTRACT

A system for extracting ontological information from a body of text is disclosed. The system parses one or more sentences from the body of text into parse tree format to generate a set of parsed sentences. The system further performs named-entity-recognition by identifying a subset of parsed sentences from the set of parsed sentences. A subset of noun phrases from the subset of parsed sentences are identified and the noun phrases are examined to classify the noun phrases as an entity or as a property. The system also identifies and outputs a conceptual relationship between the entity and the property based at least partially on grammatical relationship of the entity and the property.

20 Claims, 5 Drawing Sheets

(56) References Cited

OTHER PUBLICATIONS

Valerio et al., "Jump-Starting Concept Map Construction With Knowledge Extracted From Documents", CiteSeerX, 2006.
Meryem., "Developing a Concept Extraction System for Turkish", Msc Graduate Program in Computer Engineering, Bogazici University, pp. 1-70, 2011.
Tari et al., "Incremental Information Extraction Using Relational Databases", IEEE Transactions on Knowledge and Data Engineering, pp. 1-14, vol. 24, issue 1, Jan. 2012.
"Autonomy Technology Overview", Autonomy, pp. 1-24.
"Tme: The Semantic & Text Analysis Engine", Nstein, pp. 1-2.

\* cited by examiner

SYSTEM AND METHOD FOR EXTRACTING ONTOLOGICAL INFORMATION FROM A BODY OF TEXT

BACKGROUND

The embodiments described herein relate generally to language processing systems and, more particularly, to techniques for extracting ontological information from a body of text.

Information Extraction (IE) is the science of automating the extraction of information from unstructured or semi-structured documents. Known information extraction systems rely on natural language processing (NLP), and are traditionally implemented as a pipeline of special-purpose processing modules targeting the extraction of a particular kind of information. A major drawback of such an approach is that whenever a new extraction goal emerges or a module is improved, extraction has to be reapplied from scratch to the entire body of text even though only a small part of the text might be affected.

Other known information extraction systems rely on keyword search, which involves a set of keywords and a search mechanism as a way of locating information in text documents. However, the search mechanism relies on identifying specific words that appear in the documents without taking into account the meaning of the words. Traditional word-based approaches ignore syntactic and grammatical information present in the sentence as a whole.

Information extraction systems also rely on named-entity recognition. In analyzing documents, information extraction systems need to recognize and classify individual elements. Some known approaches to named-entity recognition involve use of a dictionary, a list of known individual elements and their pseudonyms. However, dictionaries are not always available for specific subject matter domains, such as for specific engine components or engine failure symptoms. Creating dictionaries that encounter all possible syntactic variations of technical concepts in a given subject matter domain can be a labor-intensive task. Another known approach is to devise a supervised approach to generate models based on manually annotated data. However, this approach is also a labor-intensive task.

BRIEF DESCRIPTION

In one aspect, a system for extracting ontological information from a body of text is provided. The system includes an input module configured to receive a verb phrase. The system also includes a parsing module configured to parse one or more sentences from the body of text into parse tree format to generate a set of parsed sentences. The system further includes a named-entity-recognition module configured to identify a subset of parsed sentences from the set of parsed sentences based at least partially on the occurrence of the verb phrase within at least one parsed sentence of the set of parsed sentences. The named-entity-recognition module is also configured to identify a subset of noun phrases from the subset of parsed sentences based at least partially on grammatical relationship of each noun phrase of the subset of parsed sentences to the verb phrase. The named-entity-recognition module is further configured to classify a first noun phrase in the subset of noun phrases as an entity thereby defining a first entity. The named-entity-recognition module is also configured to classify a second noun phrase in the subset of noun phrases as a property thereby defining a first property. The system also includes a concept-extraction module configured to identify and output a conceptual relationship between the first entity and the first property based at least partially on grammatical relationship of the first entity and the first property within a first sentence.

In a further aspect, a method for extracting ontological information from a body of text is provided. The method is implemented by at least one computer device including at least one processor and at least one memory device coupled to the at least one processor. The method includes converting one or more sentences in the body of text into parse tree format to generate a set of parsed sentences. The method also includes identifying a verb phrase. The method further includes identifying a subset of parsed sentences from the set of parsed sentences based at least partially on the occurrence of the verb phrase within at least one parsed sentence of the set of parsed sentences. The method also includes identifying a subset of noun phrases from the subset of parsed sentences based at least partially on grammatical relationship of each noun phrase of the subset of parsed sentences to the verb phrase. The method further includes classifying a first noun phrase and a second noun phrase in the subset of noun phrases as one of an entity and a property, thereby defining one of a first entity and a first property. The method also includes identifying a conceptual relationship between the first entity and the first property based at least in part on grammatical relationship of the first entity and the first property within a first sentence. The method further includes outputting the conceptual relationship as an identified relation between the first entity and the first property.

In yet another aspect, one or more computer-readable storage media having computer-executable instructions embodied thereon are provided. When executed by at least one processor, the computer-executable instructions cause the at least one processor to convert one or more sentences of a body of text into parse tree format, thereby generating a set of parsed sentences. The computer-executable instructions also cause the at least one processor to identify a verb phrase. The computer-executable instructions further cause the at least one processor to identify a subset of parsed sentences from the set of parsed sentences based at least partially on the occurrence of the verb phrase within at least one parsed sentence of the set of parsed sentences. The computer-executable instructions also cause the at least one processor to identify a subset of noun phrases from the subset of parsed sentences based at least partially on grammatical relationship of each noun phrase of the subset of parsed sentences to the verb phrase. The computer-executable instructions further cause the at least one processor to classify a first noun phrase and a second noun phrase in the subset of noun phrases as one of an entity and a property, thereby defining one of a first entity and a first property. The computer-executable instructions also cause the at least one processor to identify a conceptual relationship between the first entity and the first property based at least in part on grammatical relationship of the first entity and the first property within a first sentence. The computer-executable instructions further cause the at least one processor to output the conceptual relationship as a relation between the first entity and the first property.

DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "body of text" is intended to describe, without limitation, any set of text documents and text files, including the text contained within those text documents and text files. Alternatively, "text corpus" or "corpus of text" are terms used in the art as synonyms for "body of text," as used herein. "Body of text" may refer to, without limitation, something as large as a collection of documents, and to something as small as a single sentence fragment.

As used herein, the terms "ontology" and "ontological" are intended to refer, generally, to things that exist and their relationships. More specifically, as used herein, an ontology is a formal representation of knowledge, concepts, and the relationships between things. Also, as used herein, ontologies are structural frameworks for organizing information about the world, or some part of it.

As used herein, the terms "syntax" and "syntactic" refer to the way in which linguistic elements, such as words, are put together to form constituents, i.e. phrases or clauses. These terms refer to the formal properties of a language, such as English, and how its elements are arranged.

As used herein, the terms "parse" and "parsing" are used in both the linguistic sense, i.e., when discussing how phrases are divided, as well as the syntactic analysis sense, to mean the processing, analysis, and syntactic breakdown of a body of text to determine its grammatical structure with respect to formal grammar systems, such as English.

As used herein, the term "entity" is intended to refer to, without limitation, an item and an object, either in an individual capacity, or as representing a class of similar items or objects. As used herein, the term "property" is intended to be descriptive of, without limitation, a state of being of an entity, a feature or function of an entity, and a quality or trait of an entity. For example, in the text "the sponge is wet," the entity is the "sponge", and the property of the sponge is "wet".

Figure 1:
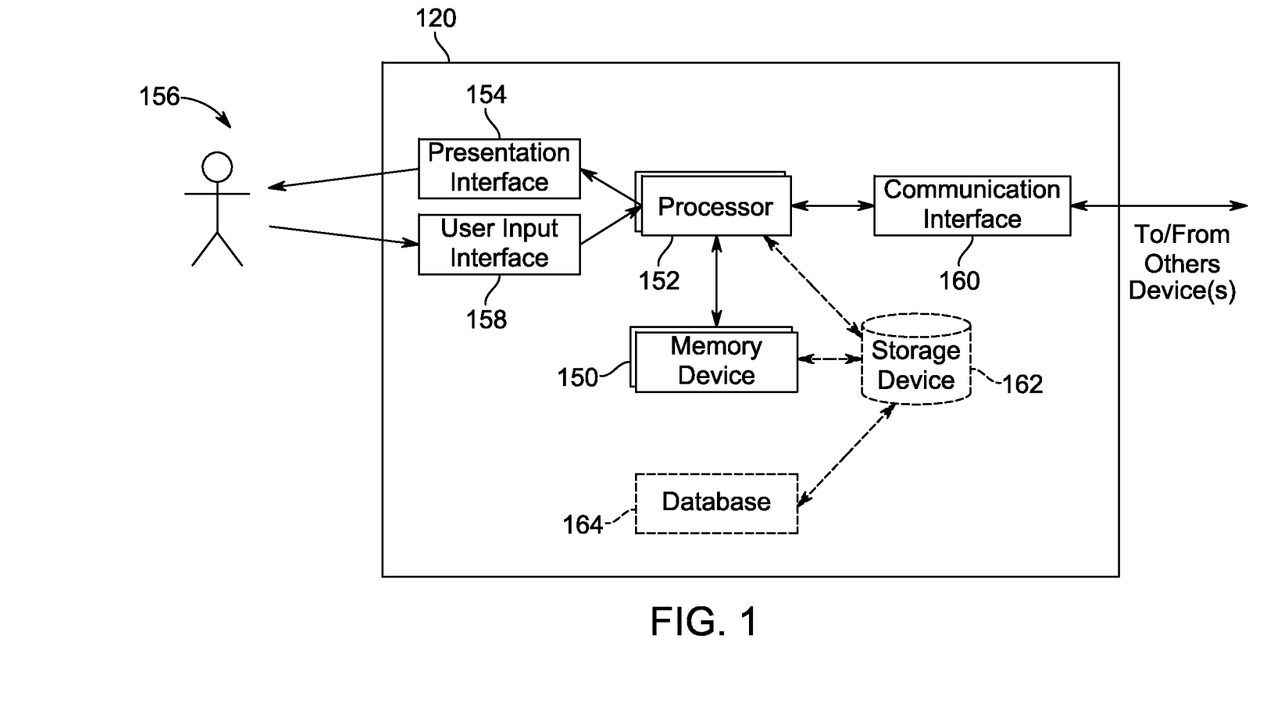
FIG. 1 is a block diagram of an exemplary computing system that may be used to extract ontological information from a body of text.

FIG. 1 is a block diagram of an exemplary computing system 120 that may be used to extract ontological information from a body of text (not shown in FIG. 1). Alternatively, any computer architecture that enables operation of the systems and methods as described herein may be used.

In the exemplary embodiment, computing system 120 includes a memory device 150 and a processor 152 operatively coupled to memory device 150 for executing instructions. In some embodiments, executable instructions are stored in memory device 150. Computing system 120 is configurable to perform one or more operations described herein by programming processor 152. For example, processor 152 may be programmed by encoding an operation as one or more executable instructions and providing the executable instructions in memory device 150. Processor 152 may include one or more processing units, e.g., without limitation, in a multi-core configuration.

In the exemplary embodiment, memory device 150 is one or more devices that enable storage and retrieval of information such as executable instructions and/or other data. Memory device 150 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or nonvolatile RAM (NVRAM) memory. The above memory types are exemplary only, and are thus not limiting as to the types of memory usable for storage of a computer program.

Also, in the exemplary embodiment, memory device 150 may be configured to store information associated with the extraction of ontological information from the body of text, including, without limitation, content from the body of text, parsed sentence information, a parse tree database (not shown in FIG. 1), one or more verb phrases, and ontological information such as a conceptual relationship between entities and properties.

In some embodiments, computing system 120 includes a presentation interface 154 coupled to processor 152. Presentation interface 154 presents information, such as a user interface and/or an alarm, to a user 156. For example, presentation interface 154 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 154 includes one or more display devices. In addition, or alternatively, presentation interface 154 may include an audio output device (not shown) (e.g., an audio adapter and/or a speaker).

In some embodiments, computing system 120 includes a user input interface 158. In the exemplary embodiment, user input interface 158 is coupled to processor 152 and receives input from user 156. User input interface 158 may include, for example, a keyboard, a pointing device, a mouse, a stylus, and/or a touch sensitive panel (e.g., a touch pad or a touch screen). A single component, such as a touch screen, may function as both a display device of presentation interface 154 and user input interface 158.

Further, a communication interface 160 is coupled to processor 152 and is configured to be coupled in communication with one or more other devices, such as, without limitation, another computing system 120, and any device capable of accessing computing system 120 including, without limitation, a portable laptop computer, a personal digital assistant (PDA), and a smart phone. Communication interface 160 may include, without limitation, a wired network adapter, a wireless network adapter, a mobile telecommunications adapter, a serial communication adapter, and/or a parallel communication adapter. Communication interface 160 may receive data from and/or transmit data to one or more remote devices. For example, communication interface 160 of one computing system 120 may transmit transaction information to communication interface 160 of another computing system 120. Computing system 120 may be web-enabled for remote communications, for example, with a remote desktop computer (not shown).

Also, presentation interface 154 and/or communication interface 160 are both capable of providing information suitable for use with the methods described herein (e.g., to user 156 or another device). Accordingly, presentation interface 154 and communication interface 160 may be referred to as output devices. Similarly, user input interface 158 and communication interface 160 are capable of receiving information suitable for use with the methods described herein and may be referred to as input devices.

Further, processor 152 and/or memory device 150 may also be operatively coupled to a storage device 162. Storage device 162 is any computer-operated hardware suitable for storing and/or retrieving data, such as, but not limited to, data associated with a database 164. In the exemplary embodiment, storage device 162 is integrated in computing system 120. For example, computing system 120 may include one or more hard disk drives as storage device 162. Moreover, for example, storage device 162 may include multiple storage units such as hard disks and/or solid state disks in a redundant array of inexpensive disks (RAID) configuration. Storage device 162 may include a storage area network (SAN), a network attached storage (NAS) system, and/or cloud-based storage. Alternatively, storage device 162 is external to computing system 120 and may be accessed by a storage interface (not shown).

Moreover, in the exemplary embodiment, database 164 contains a variety of static and dynamic data associated with, without limitation, a parse tree database (not shown in FIG. 1), the body of text, a table of entities and properties (not shown in FIG. 1), and an ontological database (not shown in FIG. 1).

The embodiments illustrated and described herein as well as embodiments not specifically described herein but within the scope of aspects of the disclosure, constitute exemplary means for extracting ontological information from a body of text. For example, computing system 120, and any other similar computer device added thereto or included within, when integrated together, include sufficient computer-readable storage media that is/are programmed with sufficient computer-executable instructions to execute processes and techniques with a processor as described herein. Specifically, computing system 120 and any other similar computer device added thereto or included within, when integrated together, constitute an exemplary means for recording, storing, retrieving, and displaying operational data associated with a concept extraction system (not shown in FIG. 1) for extracting ontological information from the body of text.

Figure 2:
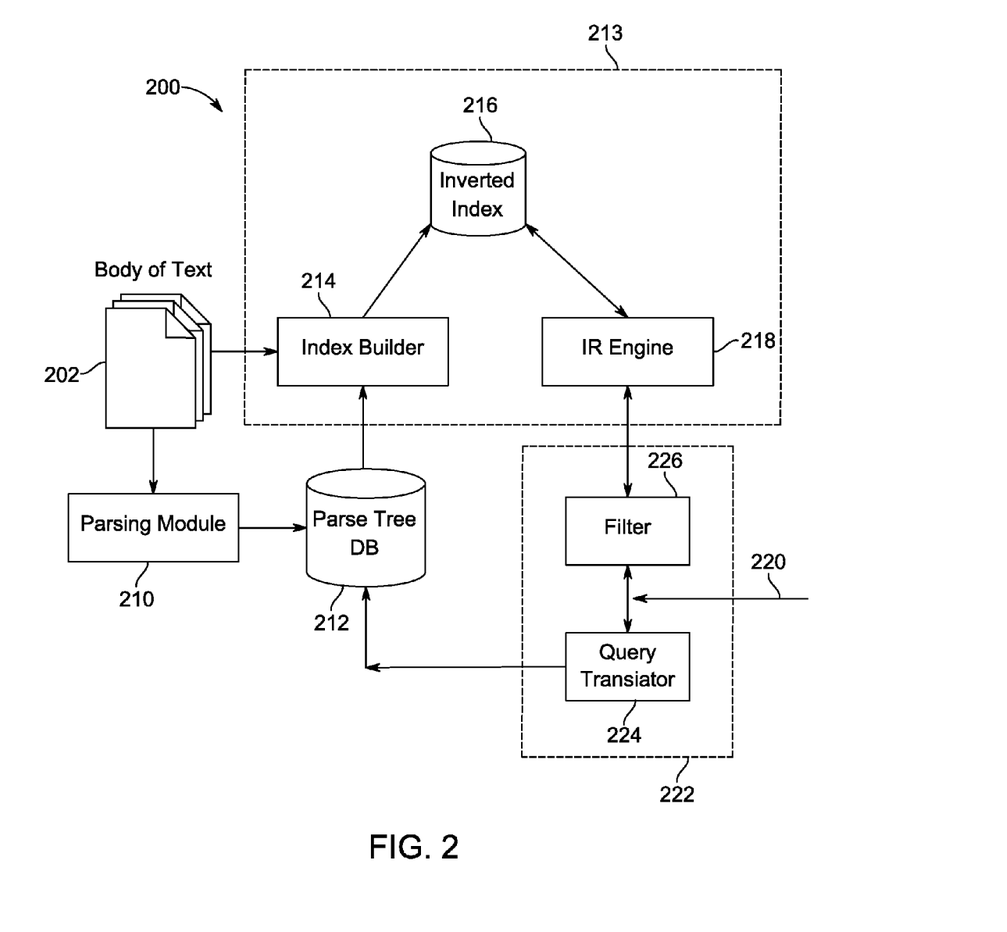
FIG. 2 is a block diagram of an exemplary text processor system for parsing and storing a body of text using the computing system shown in FIG. 1.

FIG. 2 is a block diagram of an exemplary text processor system 200 for extracting ontological information from a body of text 202 using computing system 120 (shown in FIG. 1). In the exemplary embodiment, body of text 202 includes written text. Body of text 202 may include text in any language, natural or artificial. In the exemplary embodiment, body of text 202 includes a set of documents related to a specific subject matter, e.g., a set of documents related to engine parts and equipment. Document sets with specific subject matter are more likely to generate meaningful conceptual relationships between entities and properties. Alternatively, body of text 202 may include any set of documents related to any subject matter.

Also, in the exemplary embodiment, text processor system 200 includes a parsing module 210 and a parse tree database 212. In the exemplary embodiment, parsing module 210 converts body of text 202 into parse tree format. Each sentence contained in body of text 202 is parsed by parsing module 210 into its component pieces, as described below. Parsing module 210 is a syntactic parser based on parse trees, also known as constituent trees. In the exemplary embodiment, Apache OpenNLP parser is used. Alternatively, any other parser that enables operation of text processor system 200 as described herein may be used.

Further, in the exemplary embodiment, each document in body of text 202 is represented as a hierarchical representation called the parse tree of the document (not shown in FIG. 2). Once parsed by parsing module 210, all of the parse trees of all documents in body of text 202 are stored in parse tree database 212. Parse tree database 212 includes storage for database 164 (shown in FIG. 1), as well as MySQL™ relational database management system (RDBMS) software. Alternatively, any other RDBMS such as, without limitation, Oracle™ or DB2™ that enables operation of text processor system 200 as described herein may be used. As used herein, Parse tree database 212, and the term "database", refers to either the storage for database 164, or the RDBMS (not separately shown), or both.

Figure 3:
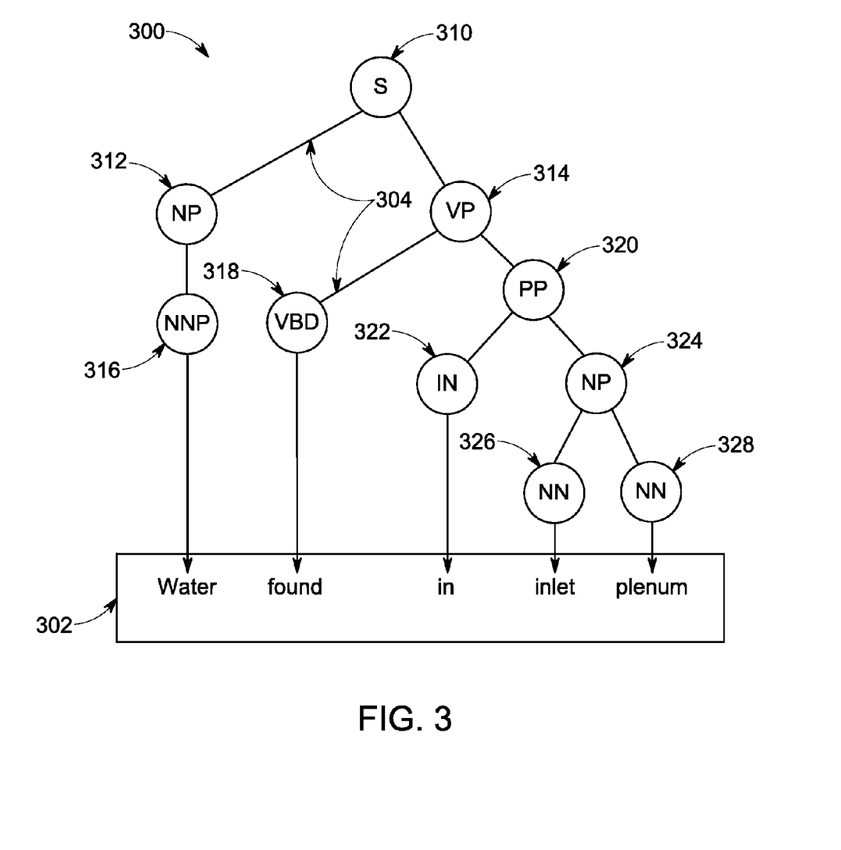
FIG. 3 is a block diagram of an exemplary parse tree structure for an exemplary sentence as created by the text processor system shown in FIG. 2.

FIG. 3 is a block diagram of an exemplary parse tree 300 for an exemplary original sentence fragment 302 that may be parsed by parsing module 210 (shown in FIG. 2). Parse tree 300 is a syntactic tree of original sentence fragment 302. Parse tree 300 generally includes two types of elements. A first of the two types of elements are constituents, i.e., the "nodes" of the tree. A second of the two types of elements are linkages 304, i.e., the lines connecting the nodes together, and represent the syntactic dependencies between pairs of words in sentence root 310. In FIG. 3, constituents are represented with circles and have a letter code corresponding to what type of sentence fragment it represents. The letter code is referred to hereinafter as a "part-of-speech tag." Original sentence fragment 302 is a sentence fragment in English, "Water found in inlet plenum." Original sentence fragment 302 is represented in parse tree 300 as sentence root 310, represented in FIG. 3 with part-of-speech tag "S", and logically represents a sentence or sentence fragment.

Also, in the exemplary embodiment, parse tree 300 further includes a first noun phrase 312 (NP), a first verb phrase 314 (VP), a proper noun 316 (NNP), a past tense verb 318 (VBD), a prepositional phrase 320 (PP), a preposition 322 (IN), a second noun phrase 324 (NP), a first noun 326 (NN), and a second noun 328 (NN). Each of these nodes is represented by a corresponding part-of-speech tag, as listed above. A "leaf node" is a node that has no children, i.e. no nodes below it to which it is linked. Each leaf node represents a single word in original sentence fragment 302.

Also, in the exemplary embodiment, parse tree 300 includes linkages 304, the inter-connecting lines between the nodes. In link grammar theory, linkages 304 represent the syntactic dependencies between pairs of words in sentence root 310.

Further, in the exemplary embodiment, original sentence fragment 302, "Water found in inlet plenum," is parsed by parsing module 210 (shown in FIG. 2). Original sentence fragment 302 is represented in parse tree 300 as the root node of the tree, sentence root 310. Upon initial evaluation by parsing module 210, sentence root 310 is determined to include first noun phrase 312, representing "Water", and first verb phrase 314, representing "found in inlet plenum." Upon further evaluation, first noun phrase 312 is determined to be proper noun 316, "Water". Upon further evaluation, first verb phrase 314 is found to include past tense verb 318, "found", as well as prepositional phrase 320, "in inlet plenum". Prepositional phrase 320 is further broken down into preposition 322, "in", along with second noun phrase 324, "inlet plenum". Second noun phrase 324 is further broken down into first noun 326, "inlet", and second noun 328, "plenum". The full parse tree 300 is the output of parsing module 210 (shown in FIG. 2) after parsing original sentence fragment 302, and represents the dependencies between pairs of words in original sentence fragment 302. This information is stored in parse tree database 212 (shown in FIG. 2). Alternatively, parse tree 300 may be stored in memory device 150 (shown in FIG. 1).

In the exemplary embodiment, parse tree 300 shows only the parse tree structure of original sentence fragment 302, and not any higher-order parse tree information above sentence root 310. In other embodiments, all of the text in entire collections of documents will be parsed into parse tree format similar to parse tree 300. Alternatively, there may be parse tree information for structures above the sentence level, such as, without limitation, paragraph-level information and document-level information.

Referring to FIG. 2, in the exemplary embodiment, text processor system 200 also includes a query subsystem 222 and a PTQL query 220. Parse Tree Query Language (PTQL) is a query language for use with text processor system 200 to submit database queries to parse tree database 212. PTQL is an extension of the linguistic query language "LPath" which facilitates queries to be performed not only on the constituent trees but also the syntactic links between words on linkages. PTQL, without limitation, facilitates expressing linguistic patterns based on parse trees, such as parse tree 300, facilitates querying the parse trees, facilitates creating expressions using immediate-following siblings and immediate-preceding siblings within parse trees, and facilitates expressing linguistic patterns based on dependency grammar PTQL query 220 is made up of four components, including tree patterns, link conditions, proximity conditions, and a return expression. A tree pattern describes the hierarchical structure and the horizontal order between the nodes of the parse tree. A link condition describes the linking requirements between nodes. A proximity condition is to find words that are within a specified number of words. A return expression defines what to return.

In operation, a user 156 (shown in FIG. 1) inputs PTQL query 220 using computing system 120 (shown in FIG. 1). The PTQL query 220 is submitted to query subsystem 222. PTQL query 220 goes through a query translator 224, which facilitates translating PTQL query 220 from PTQL to the query language understood by parse tree database 212. Query translator 224 translates PTQL query 220 into SQL, the query language understood by MySQL™ RDBMS and database 164 (shown in FIG. 1). Alternatively, other query languages that support the ability to query based on constituent trees may be used in place of PTQL. Also, alternatively, query translator 224 may translate PTQL query into any other query language, as required by the underlying RDBMS used with database 164.

Moreover, in the exemplary embodiment, text processor system 200 includes an indexing subsystem 213 and a filter 226, part of query subsystem 222. Indexing subsystem includes an index builder 214, an inverted index 216, and an IR engine 218. Index builder 214 facilitates building and maintaining inverted index 216 for the indexing of sentences according to words and the corresponding entity types. Inverted index 216 is a database index related to parse tree database 212 facilitating faster response times in the processing of database queries such as PTQL query 220. For example, and without limitation, as text processor system 200 identifies entity names within sentences in parse tree database 212, index builder 214 updates inverted index 216 to include new entities. When PTQL query 220 is submitted, query subsystem 222 sends PTQL query 220 through filter 226. If PTQL query 220 involves an entity that is in the inverted index 216, filter 226 utilizes IR engine 218 and inverted index 216 to more quickly process PTQL query 220 using inverted index 216. IR engine 218 enables efficient processing of PTQL queries 220 by selecting sentences based on the lexical features defined in PTQL queries 220, and only the subset of sentences retrieved by the IR engine are considered for the evaluation of the conditions specified in PTQL queries 220.

Figure 4:
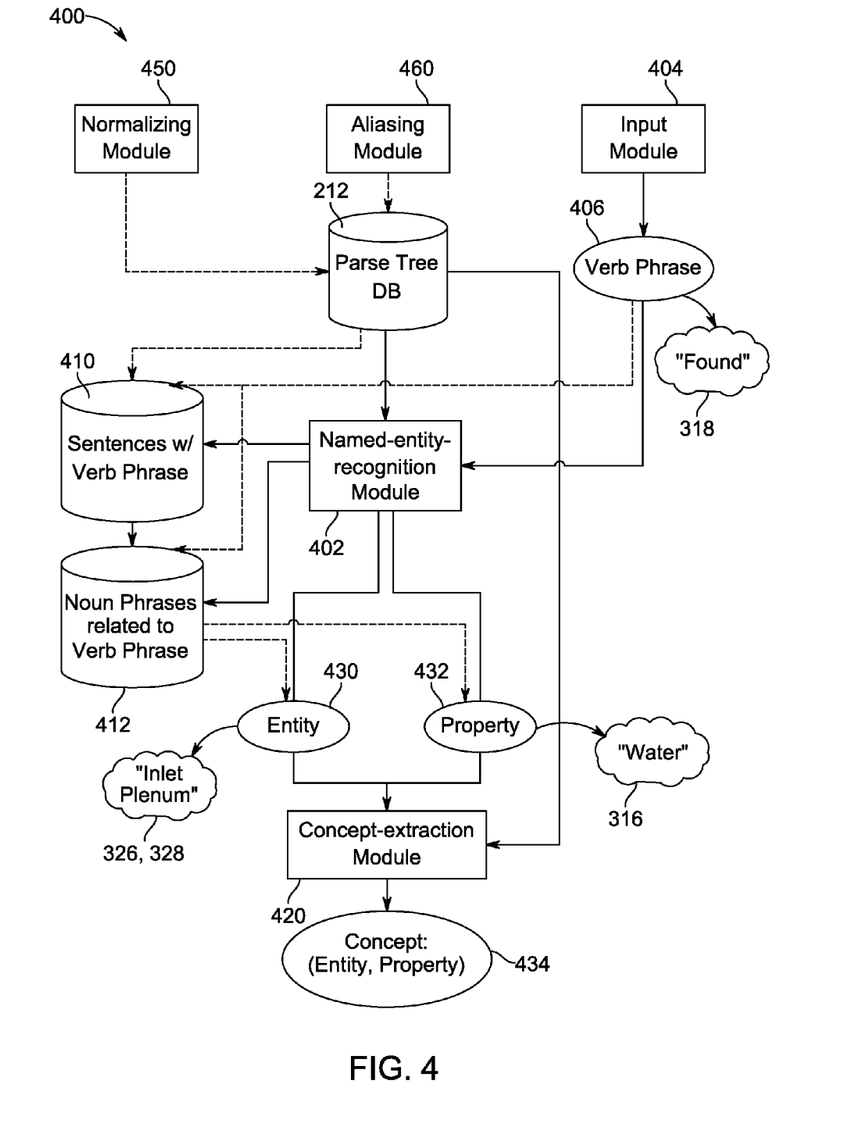
FIG. 4 is a block diagram of an exemplary system for extracting ontological information from a body of text using the computing system shown in FIG. 1 and the text processor system shown in FIG. 2.

FIG. 4 is a block diagram of an exemplary concept extraction system 400 for extracting ontological information from body of text 202 (shown in FIG. 2). Concept extraction system 400 includes a named-entity-recognition module 402 and an input module 404. Input module 404 provides a verb phrase 406, such as past tense verb 316, "found", to named-entity-recognition module 402. In some embodiments, input module 404 may receive verb phrase 406 from user 156 (shown in FIG. 1) using computing system 120 (shown in FIG. 1). Alternatively, without limitation, input module 404 may identify verb phrase 406 using any process for identifying verb phrases relevant to body of text 202. In another embodiment, verb phrase 406 is identified through "bootstrapping" verb phrases, a method of identifying verb phrase 406 from body of text 202 based on a grammatical relationship between verb phrase 406 and another already-known entity or property.

Moreover, concept extraction system 400 queries parse tree database 212 using verb phrase 406 to identify a subset of sentences 410 that include verb phrase 406. Concept extraction system 400 then identifies a subset of noun phrases 412 related to verb phrase 406 within subset of sentences 410. Concept extraction system 400 identifies subset of noun phrases 412, without limitation, based at least partially on grammatical relationship of a noun phrase (not shown in FIG. 4) to verb phrase 406 within a sentence (not shown in FIG. 4). For example, and without limitation, the grammatical relationship between proper noun 316 "water" and past tense verb 318 "found" in original sentence fragment 302 (shown in FIG. 3). More specifically, for example, and without limitation, consider the following PTQL query:

```
//S{/NP(kw2)->/VP{/?[Value='found']->/PP{/?[Value='in']->
//NP(kw1)}}}
::: distinct kw1.value, kw2.value
```

The above PTQL query defines the pattern in finding a sentence that contains noun phrases 412 kw1 and kw2 related to verb phrase 406 "found in". The return expression, which is stated in the expression to the right of the ":::" symbols, defines the output values of kw1 and kw2. When the above PTQL query is applied to sentence 302 (shown in FIG. 3), "water found in inlet plenum", the phrases "inlet plenum" and "water" are returned as the values of kw1 and kw2.

Further, from subset of noun phrases 412, concept extraction system 400 classifies noun phrases as either an entity 430, such as "inlet plenum" (shown in FIG. 3 as first noun 326 and second noun 328), or a property 432, such as proper noun 316 "water". Alternatively, concept extraction system 400 may classify a noun phrase as an entity based on grammatical relationship to a preposition and an already-classified property. For example, without limitation, if "water" has previously been classified as a "property", then "water found in <X>" grammatically suggests that <X> is likely an "entity". Alternatively, concept extraction system 400 may classify a noun phrase as a "property" based on grammatical relationship to a preposition and an already-classified "entity". For example, without limitation, if "inlet plenum" has previously been classified as an "entity", then "<Y> found in inlet plenum" grammatically suggests that <Y> is a "property". Alternatively, concept extraction system 400 may classify a noun phrase as a "property" based on grammatical relationship to a preposition. For example, without limitation, "<Y> in <X>" may grammatically suggest that <Y> is a "property" given that <X> is recognized as an "entity", because the English language normally uses the preposition "in" with the property preceding. All noun phrases in subset of noun phrases 412 may be classified, but minimally at least one entity 430 and one property 432 may be classified. Named-entity-recognition module 402 stores classification information for entity 430 and property 432 in parse tree database 212. Alternatively, classification information may be stored in any way, such as, without limitation, memory device 150 (shown in FIG. 1), that enables operation of system 200 as described herein.

Moreover, in the exemplary embodiment, concept extraction system 400 includes a normalizing module 450. Normalizing module 450 normalizes like noun phrases by the methods of, without limitation, stemming, dropping extraneous articles, and dropping adjectives. "Normalization," in the linguistic context here, refers to renaming like words or phrases to a single, standard form. Stemming is a process for reducing inflected words to their stem, or root word, for example, and without limitation, identifying "fishing", "fished", "fish", and "fisher" to the root word "fish". Dropping extraneous articles refers to a process for dropping "a" from "a fisher" to identify just "fisher". Dropping adjectives is a process for eliminating a descriptive adjective from a noun phrase, such as removing "smelly" from "smelly fisher" to identify just "fisher". Alternatively, normalizing module 450 may use any methods of normalizing like nouns and noun phrases. Methods of normalizing help to reduce what may be duplicate entities.

Further, in the exemplary embodiment, concept extraction system 400 includes an aliasing module 460. Aliasing module 460 helps standardize names of entities and properties by replacing related entities or properties with a single alias, a standard name by which all of the related entities or properties are going to be called. For example, and without limitation, aliasing module 460 may create an alias "Part_compressor_blade" for any entities called either "compressor blades" or "compressor blade." Aliasing module 460 replaces all occurrences of "compressor blades" and "compressor blade" in parse tree database 212 with the alias "Part_compressor_blade". Alternatively, aliasing module 460 may use any method of aliasing.

Moreover, concept extraction system 400 includes a concept-extraction module 420. Concept-extraction module 420 identifies and outputs a conceptual relationship 434 between entity 430 and property 432 based at least partially on grammatical relationship between entity 430 and property 432 within sentence root 310 (shown in FIG. 3) as stored in parse tree database 212. Alternatively, concept-extraction module 420 can identify conceptual relationship 434 between entity 430 and property 432 in any parsed sentence not necessarily stored in parse tree database 212. For example, and without limitation, consider the following PTQL query:

```
//NP{/?[Tag= 'Property'](kw2)->
/PP{/?[Value IN {'in','on','from'}]->/?[Tag='Entity'](kw1)}}
::: distinct kw1.value, kw2.value
```

The above PTQL query defines the pattern for entity-property relation extraction. The constructs "Tag='Entity'" and "Tag='Property'" correspond to noun phrases 412 that have been identified as entities 430 and properties 432. This PTQL query defines a syntactic constraint that, within a noun phrase 412, an identified property is followed by a prepositional phrase that includes a preposition and an identified entity. The returning entities and properties, i.e., the values of kw1 and kw2, are deemed to have entity-property relations, denoted as <entity, property>.

In the exemplary embodiment, named-entity-recognition module 402 and concept-extraction module 420 submit PTQL queries 220 (shown in FIG. 2) to parse tree database 212 when performing execution tasks such as, without limitation, identifying subset of sentences 410 with verb phrase 406, identifying subset of noun phrases 412 related to verb phrase 406 within the subset of sentences 410, classifying noun phrases as either an entity or a property, and identifying conceptual relationship 434 between entity 430 and property 432.

Figure 5:
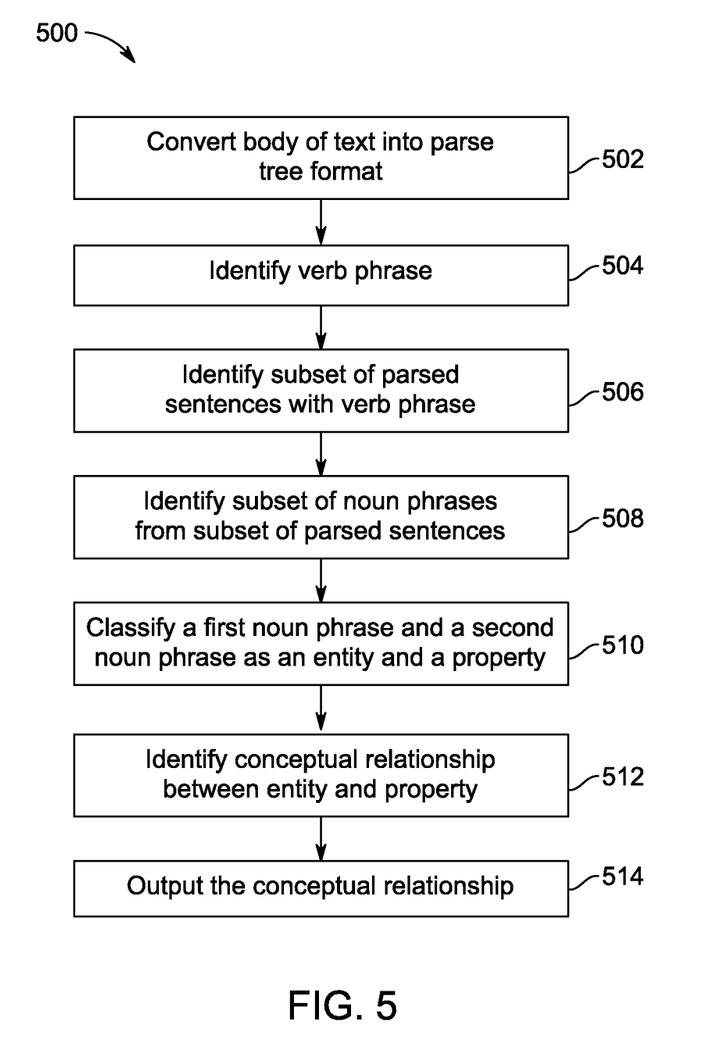
FIG. 5 is a flow chart of a method for extracting ontological information from a body of text shown in FIGS. 2 and 4.

FIG. 5 is a flow chart of an exemplary method 500 for extracting ontological information from body of text 202 (shown in FIGS. 2 and 4). More specifically, method 500 extracts conceptual relationship 434 (shown in FIG. 4) from body of text 202 (shown in FIG. 2). Body of text 202 is converted 502 into parse tree format. Verb phrase 406 (shown in FIG. 4) is identified 504. Subset of sentences 410 (shown in FIG. 4) is identified 506 from body of text 202 using verb phrase 406. From subset of sentences 410, subset of noun phrases 412 (shown in FIG. 4) is identified 508. From subset of noun phrases 412, entity 430 (shown in FIG. 4) and property 432 (shown in FIG. 4) are classified 510. Conceptual relationship 434 (shown in FIG. 4) between entity 430 and property 432 is identified 512, and is then output 514. In some embodiments, conceptual relationship 434 may be output 514 to user 156 (shown in FIG. 1) using computing system 120 (shown in FIG. 1). In other embodiments, conceptual relationship 434 may be stored in an ontological database (not separately shown) in database 164 (shown in FIG. 1).

The above-described systems and methods provide a way to extract conceptual relationships from a web of unstructured text documents. Information Extraction (IE) systems are traditionally implemented in file-based ways that require repeated processing of text documents as new kinds of information are desired. The embodiments described herein allow for sentence parsing and database storage, encapsulating not only the word content but also the grammatical relationships between words within a sentence. The use of a database, along with supporting query language and infrastructure, minimizes reprocessing requirements, enables faster information retrieval as new extraction goals are identified, and provides a process for generic extraction. Moreover, the above-described systems and methods provide a way to extract conceptual relationships from a web of unstructured text documents in a way that requires no use of dictionaries of technical concepts or the manual annotation of training data, and limited human involvement in the process. The systems and methods described above do not rely on labor-intensive efforts, and can be applied to various business domains. Storing unstructured text documents in a structured format allows for unsupervised data mining, and the discovery of conceptual relationships based on grammatical relationships within the text.

An exemplary technical effect of the methods, systems, and apparatus described herein includes at least one of: (a) reducing reprocessing requirements by retaining both content and grammatical relationship information for the body of text in a parse tree database, with both current queries, as well as when new extraction goals are identified; (b) facilitating a process for generic extraction, as the systems and methods are not subject-specific, and can be applied across business and technical domains; and (c) facilitating unsupervised information extraction, as the systems and methods require less human involvement for training.

Exemplary embodiments of systems and methods for extracting ontological information from a body of text are described above in detail. The systems and methods described herein are not limited to the specific embodiments described herein, but rather, components of systems and/or steps of the methods may be utilized independently and separately from other components and/or steps described herein. For example, the methods may also be used in combination with other systems requiring concept extraction systems and methods, and are not limited to practice with only the text processing system and concept extraction system and methods as described herein. Rather, the exemplary embodiments can be implemented and utilized in connection with many other concept extraction applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for extracting ontological information from a body of text, said system comprising:
   an input module configured to receive a verb phrase;
   a parsing module configured to parse one or more sentences from the body of text into parse tree format, thereby generating a set of parsed sentences;
   a named-entity-recognition module configured to:
     identify a subset of parsed sentences from the set of parsed sentences based at least partially on the occurrence of the verb phrase within at least one parsed sentence of the set of parsed sentences;
     identify a subset of noun phrases from the subset of parsed sentences based at least partially on grammatical relationship of each noun phrase of the subset of parsed sentences to the verb phrase;
     classify a first noun phrase in the subset of noun phrases as an entity, thereby defining a first entity; and
     classify a second noun phrase in the subset of noun phrases as a property, thereby defining a first property; and
   a concept-extraction module configured to identify and output a conceptual relationship between the first entity and the first property based at least partially on grammatical relationship of the first entity and the first property within a first sentence, the output being to a display device for viewing by a user.

2. The system in accordance with claim 1, further comprising a parse tree database, wherein the parsing module is further configured to store the set of parsed sentences in the parse tree database.

3. The system in accordance with claim 1, further comprising a normalizing module configured to normalize one or more noun phrases in the subset of noun phrases by one or more of stemming, dropping extraneous articles, and dropping adjectives.

4. The system in accordance with claim 1, further comprising an aliasing module configured to alias one or more noun phrases in the subset of noun phrases by re-naming like noun phrases with a single alias.

5. The system in accordance with claim 1, wherein said named-entity-recognition module further configured to classify a third noun phrase as a second entity based at least partially on grammatical relationship of the third noun phrase to both a preposition and the first property in a second sentence.

6. The system in accordance with claim 1, wherein said named-entity-recognition module further configured to classify a third noun phrase as a second property based at least partially on grammatical relationship of the third noun phrase to both a preposition and the first entity in a second sentence.

7. The system in accordance with claim 1, wherein said named-entity-recognition module further configured to classify a first noun phrase as a first entity based at least partially on grammatical relationship of the first noun phrase to one or more prepositions within a second sentence.

8. The system in accordance with claim 1, wherein said named-entity-recognition module further configured to classify a second noun phrase as a first property based at least partially on grammatical relationship of the second noun phrase to one or more prepositions within a second sentence.

9. One or more non-transitory computer-readable storage media having computer-executable instructions embodied thereon, wherein when executed by at least one processor, the computer-executable instructions cause the processor to perform operations comprising:
    converting one or more sentences of a body of text into parse tree format, thereby generating a set of parsed sentences;
    identifying a verb phrase;
    identifying a subset of parsed sentences from the set of parsed sentences based at least partially on the occurrence of the verb phrase within at least one parsed sentence of the set of parsed sentences;
    identifying a subset of noun phrases from the subset of parsed sentences based at least partially on grammatical relationship of each noun phrase of the subset of parsed sentences to the verb phrase;
    classifying a first noun phrase and a second noun phrase in the subset of noun phrases as one of an entity and a property, thereby defining one of a first entity and a first property;
    identifying a conceptual relationship between the first entity and the first property based at least in part on grammatical relationship of the first entity and the first property within a first sentence; and
    outputting the conceptual relationship as a relation between the first entity and the first property to an output device for viewing.

10. The non-transitory computer-readable storage media in accordance with claim 9, wherein the computer-executable instructions further cause said processor to perform operations comprising:
    normalizing one or more noun phrases in the subset of noun phrases by one or more of stemming, dropping extraneous articles, and dropping adjectives; and
    aliasing one or more noun phrases in the subset of noun phrases by renaming like noun phrases with a single alias.

11. The non-transitory computer-readable storage media in accordance with claim 9, wherein said computer-executable instructions further cause said processor to perform operations comprising classifying a second noun phrase as an entity based at least partially on grammatical relationship of the second noun phrase to both a preposition and a property in a second sentence.

12. The non-transitory computer-readable storage media in accordance with claim 9, wherein said computer-executable instructions further cause said processor to perform operations comprising classifying a second noun phrase as a property based at least partially on grammatical relationship of the second noun phrase to both a preposition and an entity in a second sentence.

13. The non-transitory computer-readable storage media in accordance with claim 9, wherein said computer-executable instructions further cause said processor to perform operations comprising classifying a first noun phrase in the subset of noun phrases as one of an entity and a property based at least partially on grammatical relationship of the first noun phrase to one or more prepositions within a second sentence.

14. A method for extracting ontological information from a body of text, said method implemented by at least one computer device including at least one processor and at least one memory device coupled to the at least one processor, said method comprising:
    converting, by the at least one computer device, one or more sentences in the body of text into parse tree format, thereby generating a set of parsed sentences in the at least one memory device;
    identifying a verb phrase;
    identifying a subset of parsed sentences from the set of parsed sentences based at least partially on the occurrence of the verb phrase within at least one parsed sentence of the set of parsed sentences;
    identifying a subset of noun phrases from the subset of parsed sentences based at least partially on grammatical relationship of each noun phrase of the subset of parsed sentences to the verb phrase;
    classifying a first noun phrase and a second noun phrase in the subset of noun phrases as one of an entity and a property, thereby defining one of a first entity and a first property;
    identifying a conceptual relationship between the first entity and the first property based at least in part on grammatical relationship of the first entity and the first property within a first sentence; and
    outputting the conceptual relationship as an identified relation between the first entity and the first property to a presentation interface for viewing.

15. The method in accordance with claim 14, further comprising normalizing one or more of the noun phrases of the subset of noun phrases, wherein normalizing comprises at least one of stemming, dropping extraneous articles, and dropping adjectives.

16. The method in accordance with claim 14, further comprising aliasing one or more noun phrases of the subset of noun phrases comprising renaming like noun phrases with a single alias.

17. The method in accordance with claim 14, further comprising classifying a second noun phrase as an entity based at least partially on grammatical relationship of the second noun phrase to both a preposition and a property in a second sentence.

18. The method in accordance with claim 14, further comprising classifying a second noun phrase as a property based at least partially on grammatical relationship of the second noun phrase to both a preposition and an entity in a second sentence.

19. The method in accordance with claim 14, further comprising identifying a second verb phrase based at least partially on grammatical relationship of the second verb phrase to at least one of the first entity and the first property.

20. The method in accordance with claim 14, wherein classifying a first noun phrase is based at least partially on grammatical relationship of the first noun phrase to one or more prepositions within a second sentence.

\* \* \* \* \*